Dec. 8, 1953   F. E. ASPELIN   2,661,929
JIG FOR DRILLING KEY LEWIS SLOTS
Filed May 3, 1948   3 Sheets-Sheet 1
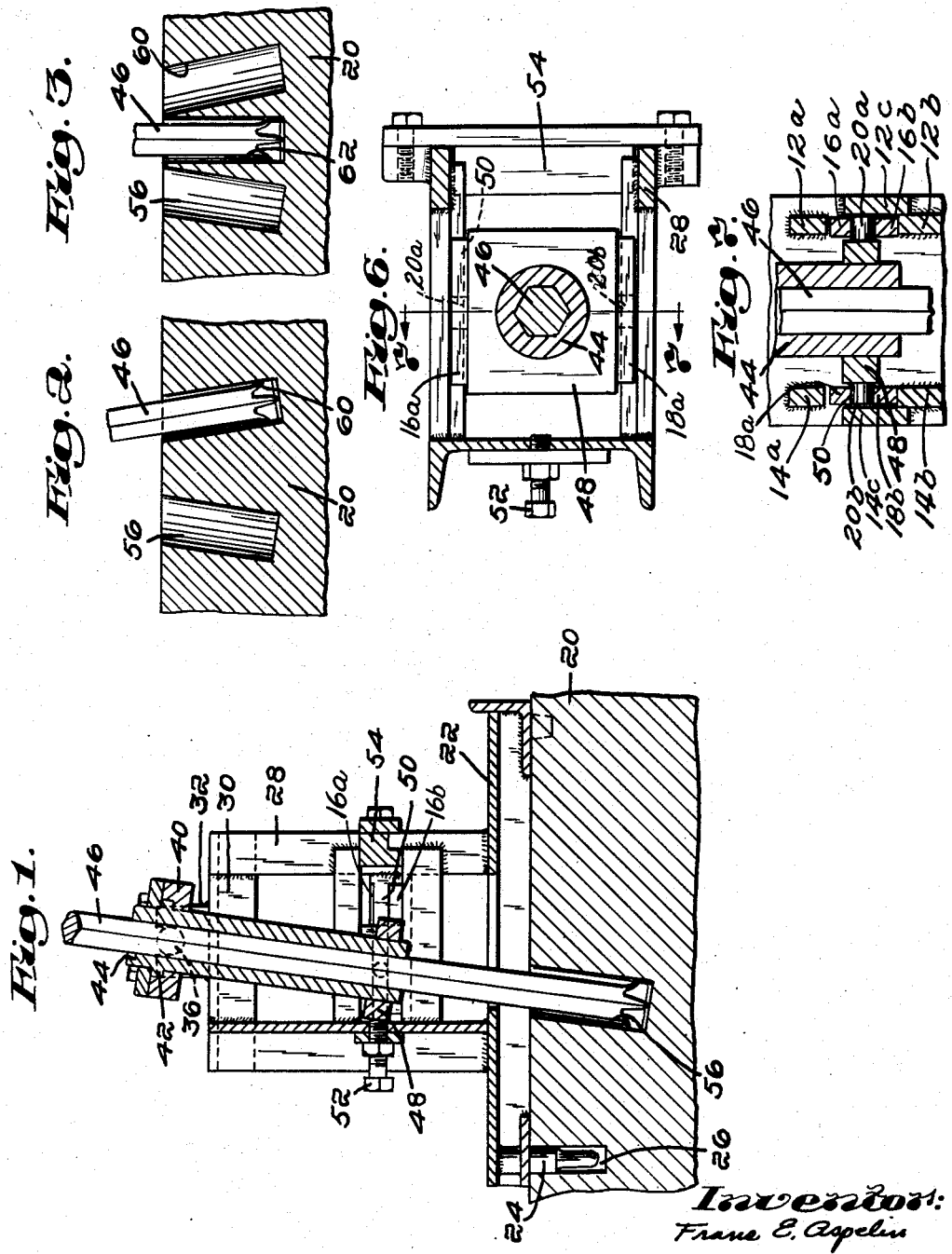
Inventor:
Frank E. Aspelin
by Munn W. Hamilton
Attorney

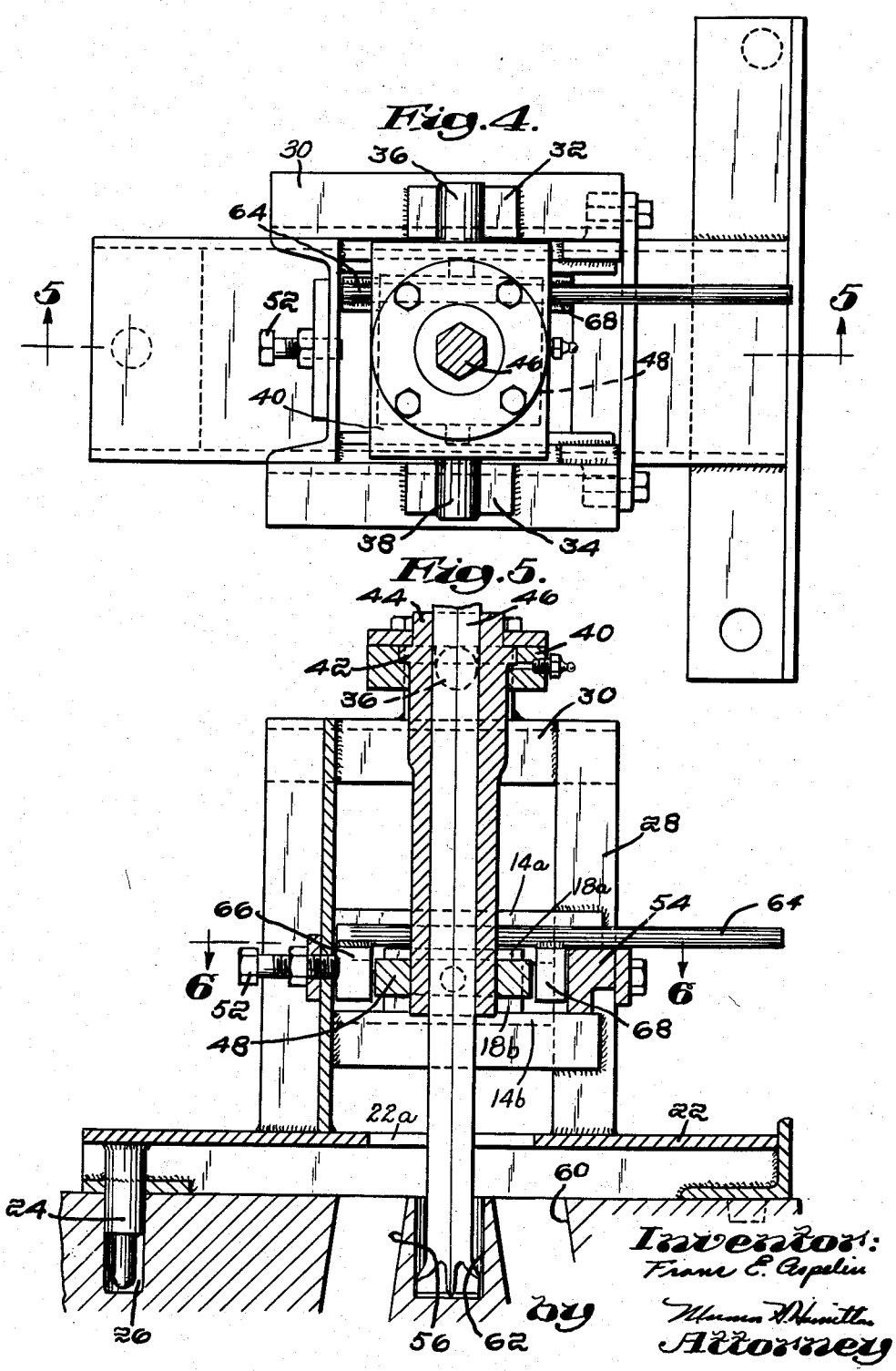

Dec. 8, 1953   F. E. ASPELIN   2,661,929
JIG FOR DRILLING KEY LEWIS SLOTS
Filed May 3, 1948   3 Sheets-Sheet 3
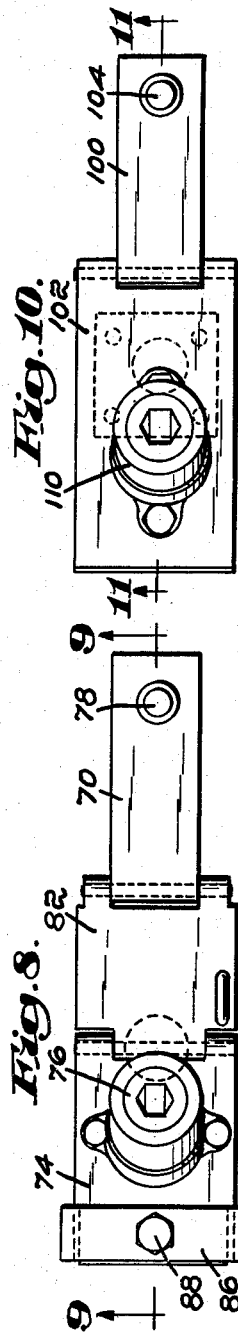
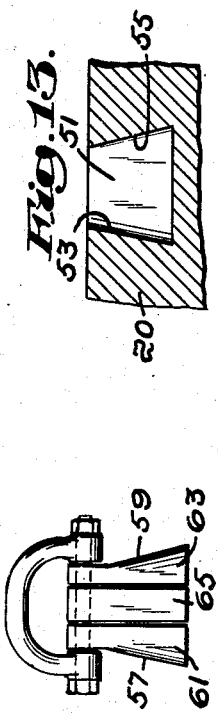
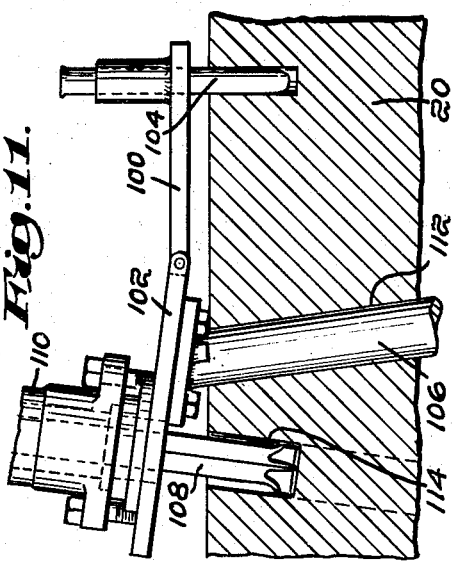
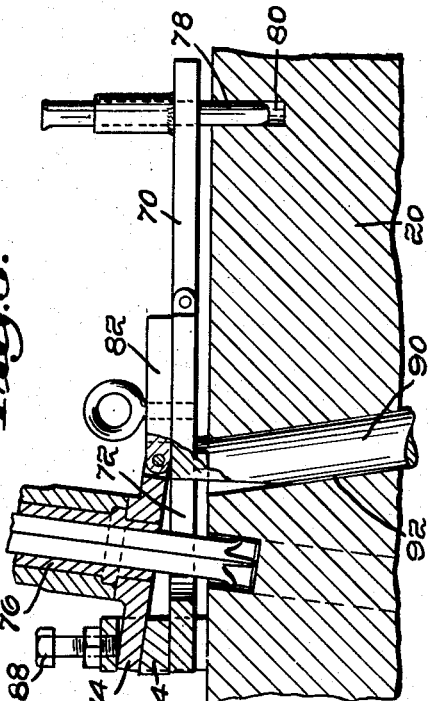
Inventor:
Frans E. Aspelin
by
Attorney Patented Dec. 8, 1953

2,661,929

UNITED STATES PATENT OFFICE 2,661,929

JIG FOR DRILLING KEY LEWIS SLOTS

Frans E. Aspelin, Nabnasset, Mass., assignor to H. E. Fletcher Company, West Chelmsford, Mass.

Application May 3, 1948, Serial No. 24,839

4 Claims. (Cl. 255—51)

This invention relates to an improved drill jig for use in carrying out drilling operations of the type in which a dove-tail mortise is required to be cut in a piece of stone in order to receive an iron dovetailed tenon or lewis by which the stone may be lifted. While not being limited thereto, the jig is especially adapted for use in forming a mortise for a lewis of the sectional type including two tapered side sections and a middle section for wedging the two side sections against the mortise edges.

It is in general an object of the invention to provide an improved drill jig for holding a drill in an inclined position and especially for controlling the angle of inclination at which a drill is required to be held against a stone body in cutting the two tapering sides of the dovetail mortise noted. Another object of the invention is to devise a compact drill jig of a size practical for handling and moving about in a stone quarry so that it may be quickly and positively located at any desired point on a stone surface to be cut.

In one specific aspect, the drill jig of the invention is concerned with difficulties involved in cutting a dovetail mortise or lewis slot in a piece of granite. The usual procedure is to drill two spaced-apart holes at an angle to one another and then to drill a third hole between the two first holes, after which the remaining stone portions occurring between the holes are removed with a broaching tool. In actual practice it is sometimes difficult to hold a drilling tool by hand and drill a hole at an angle coinciding with the angle of taper of one of the lewis sides to be engaged in the finished slot; and it is especially difficult to drill two oppositely inclined holes extending at precisely the same angle of inclination with respect to the vertical axis of the mortise. It is pointed out that if either of the mortise sides fails to coincide in angularity with its corresponding lewis side taper, there will be a reduction in bearing area of the lewis against the stone, and since the lifting force is upward a relatively greater amount of stress will be concentrated at points relatively nearer the top edges of the mortise where the lewis sides do come into contact with the stone. In many cases, it turns out that the excessively heavy stresses directed at the relatively thinner and weaker top edges of the slot cause these edges to crumble and chip off in small particles. Such an occurrence tends to initiate a progressive crumbling of stone immediately adjacent the lewis sides, terminating in release of the lewis and dropping of the stone with possible danger to personnel and destruction of property.

The drill jig of the invention eliminates most of the difficulties described by providing a positive means of positioning a drill so that the mortise sides formed by the drill will be of approximately the same degree of angularity and will in each case coincide with the angle of the lewis side located thereagainst. Consequently a uniformly balanced bearing effect is insured when a lewis member is engaged in the slot or mortise and a great deal of the breaking of the stone is avoided. An important feature of the invention therefore is a drill jig which supports a drill guide in a position in which it can be rotated about a horizontal axis to locate the drill at various desired angles. The drill is preferably received in a freely supported drill sleeve, which at its lower end is adjustably secured in a holder element consisting of a slidable block keyed between two opposite sides of the frame. The holder is arranged to move through a path which is limited in either direction by conveniently placed stop members adjustably secured in the sides of the frame to vary the angularity as desired.

Another feature of the drill jig of the invention is a frame of open construction in which the drill guide is conveniently positioned, and from which the guide, drill sleeve and drill may be instantly removed to facilitate handling and moving about from one place to another on a stone surface in which mortises are to be cut.

These and other objects and novel features of the invention will be best understood and appreciated from the two preferred embodiments of the invention selected for purposes of illustration and shown in the accompanying drawings, in which Fig. 1 is a symmetrical vertical cross section of the drill jig of the invention shown in an operative position above a piece of stone in which one side of a mortise has been cut;

Fig. 2 is a detail cross-sectional view indicating an alternate position of a drill member;

Fig. 3 is a cross-sectional view illustrating a third position which may be assumed by the drill as supported in the jig of Fig. 1;

Fig. 4 is a plan view of the jig with a drill member in cross section shown supported therein;

Fig. 5 is a vertical cross section taken on the line 5—5 of Fig. 4;

Fig. 6 is a cross section taken on the line 6—6 of Fig. 5;

Fig. 7 is a detail fragmentary cross section taken on the line 7—7 of Fig. 6;

Fig. 8 is a plan view of another form of adjustable drill jig;

Fig. 9 is a fragmentary cross-sectional view taken on the line 9—9 of Fig. 8;

Fig. 10 is a plan view showing another simplified and non-adjustable jig modification;

Fig. 11 is a cross-sectional view taken on the line 11—11 of Fig. 10;

Fig. 12 is a view in side elevation illustrating a dovetail tenon or lewis member;

Fig. 13 is a fragmentary cross-sectional detail of a piece of stone illustrating a mortise or lewis slot formed therein; and Fig. 14 is an assembly view showing a lewis member engaged in a dovetail mortise of a stone body in position for lifting.

The general plan of the drill jig of the invention includes a base with anchoring means for holding the base in relatively fixed position on a stone surface; a drill guide for rotatably supporting a drill casing or sleeve in varying positions above the base; and stop means combined to position the drill at predetermined angles with respect to the vertical axis of the frame. In the use of the device, it is contemplated that lewis members having sides of known angularity will be employed and the angles at which the drill guide is to be positioned will be chosen to correspond to the angularity of the lewis. In a preferred application of the jig, two oppositely inclined holes are drilled in a relative position such that the center lines of the two holes when extended meet at a point lying along the horizontal axis about which the drill guide is rotated.

Considering the structure shown in the drawings in greater detail, numeral 20 denotes a body of stone such as granite or other rock. For purposes of explanation it may be assumed that the stone body has been separated from other contiguous stone masses in a quarry, thus leaving a block which is to be lifted out of the quarry and conveyed to other points where various finishing operations are desired to be carried out. Numeral 22 denotes a base having a drill aperture 22a adapted to be located upon the surface of the stone body 20, preferably in a slightly raised position as suggested in Fig. 1. A pin member 24 may be provided at the under side of the base to constitute an anchoring means for aiding in holding the base in a relatively fixed position on the surface of the stone. For this purpose, a small drill hole 26 is first cut into the stone, using conventional drilling facilities.

Extending upwardly from the base 22 is a frame 28 including at the upper side thereof cross bars 30 as indicated in Figs. 1 and 4. The cross bars 30 support a pair of bearing members 32 and 34. The bearings are formed with semi-annular bearing surfaces in which are received studs 36 and 38, supporting therebetween a drill guide plate 40. The guide plate is formed in two sections, bolted together, with the lower section being recessed to receive a rib 42 formed on a drill sleeve 44, freely disposed in the drill guide. A drill 46 is slidably supported within the drill sleeve 44 and both the drill sleeve and drill extend downwardly in spaced relation to the frame 28. The lower end of the drill sleeve 44 extends through and is slidably received in a holder element 48 consisting of a transversely movable block located in an enclosure in the lower part of the jig frame. The enclosure is formed of sides as 12a, 12b, 12c, and opposite sides 14a, 14b and 14c.

Arranged on the inner surfaces of the sides are guide strips 16a and 16b, together with strips 18a and 18b, which strips are mounted in vertically spaced relation to define ways 50. The ways 50 are adapted to receive slidably therein studs 20a and 20b projecting from two opposite sides of the movable block 48. It will be seen that when the drill sleeve or casing is swung about its pivot point, it will slide in the block and move the latter member, for example from a substantially level position such as that shown in Fig. 5 to an angularly disposed position such as that shown in Fig. 1, with the block and studs sliding along the ways 50 and simultaneously rotating a slight degree therein.

The holder member 48 can thus be swung from one side of the enclosure to the other into contact with one or the other of the stop members 52 and 54, which thereby serve to limit the arc of rotation of the drill sleeve member and drill guide in the bearing members 32 and 34. The stop members may be adjusted to vary the travel of the holder 48 and thus change the angle of inclination of the drill sleeve as may be dictated by the requirements of various angles encountered in different types of lewis members.

It will be observed that the left and right vertical edges of the block 48, in a centered position and as viewed in Fig. 5, lie in spaced relation to the stop members 52 and 54, and thus provide keyways or slots in which to receive extensions 66 and 68 of a key 64 and thereby hold the block in a centered position for normal drilling after angular drilling has been completed.

Numeral 56 (Fig. 2) denotes a drill slot resulting from the operation of a drill held in a position such as illustrated in Fig. 1, with the slidable block 48 moved over into engagement with the stop member 52. The drill may be held in the inclined position noted during the application of hammer blows either by gripping the drill manually or by mechanically engaging the drill in a tool such as a pneumatic hammer. The drill and sleeve may be rotated about its horizontal axis in a counter-clockwise direction as viewed in Fig. 1, into an opposite position to form a second drilled hole 60 (Fig. 2), with no further adjustment being necessary and without the need for removing the drill from the jig structure. When the two oppositely opposed angularly extending holes have been formed, a third central and vertically disposed hole 62 may be formed by moving the holder, drill sleeve and drill into an intermediate position and locking them in this position by means of the key element 64 (Fig. 4). The key element consists of an elongated rod from which project at substantially right angles thereto a pair of spaced-apart extensions 66 and 68. When inserting the key in the manner described and shown in Figs. 4 and 5, the extensions are allowed to drop into spaces occurring between the frame and adjacent block surfaces so that a locking effect is produced with relative movement of the block in either direction being prevented. It should be understood that the drill jig is made of heavy steel sections, commonly weighing as much as 40 or 50 lbs. and, therefore, has inherently a considerable amount of stability. It is further pointed out that the drills used with this type of drill jigs are drills running from 12" in length up to 18" or 24", and larger, and having a diameter of anywhere from 1" to 3", so that the drills themselves are relatively heavy and not easily displaced out of a position in which they become supported. With these structural characteristics in mind, it will readily be appreciated that if a drill is placed in the drill jig and allowed to slide down in to contact with the surface to be drilled, it requires a considerable lifting force to pull the drill up and out of the drill sleeve. Now, with the holder element limited to rotation through a single vertical plane, by reason of the guideways formed in the frame, and with the drill resting heavily upon the surface to be drilled in any desired position of angularity where the holder element rests against a stop member, there is little opportunity for a change in position of angularity of the drill. In effect, the drill itself, when resting against the stone, tends to lock the slide or plate in a substantially fixed position, and the only way that the slide can be changed is by lifting up the drill out of its holder. Finally, it is pointed out that in many cases these drills are used with the operator gripping the top of the shank of the drill either directly by hand or by means of a mechanical gripping agent, or through the agency of a pneumatic hammer chuck. Thus the drill, with very little holding force, is maintained against the stone surface which is to be drilled. Broaching is then carried out in the conventional manner to form a dovetail mortise or lewis slot 51 as suggested in Fig. 13, having inclined sides 53 and 55 which correspond in angularity to inclined sides 57 and 59 of respective side sections 61 and 63 of a lewis member such as indicated in Fig. 12. A central wedge section 65 provides a means of locking the lewis in the slot 51. When engaged in the slot and subjected to a lifting force, the lewis sides come to bear uniformly on the two sides of the slot at all points therealong, as illustrated in Fig. 14. The stresses are thus distributed over the full areas of contact and breaking of the edges is greatly reduced.

An alternate form of jig for positioning a drill guide in a desired position of angularity has been indicated in Figs. 8 and 9 in which a base 70 is provided with a drill aperture 72, above which is located a guide plate 74. A drill sleeve 76 is freely supported in the plate 74 and an extended neck portion thereof as noted in Figs. 8 and 9. A pin 78 is transversely and slidably received through the outer end of the base 70 to provide an anchoring means when engaged in small drill hole 80.

The base has superimposed thereon a support member 82 at one edge of which is pivotally secured the drill guide 74 so that the guide may be rotated about a horizontal axis and in so doing become raised into an inclined position. A spacing block 84 is provided for insertion between the outer end of the guide 74 and the base in order to maintain a fixed position of angularity in which a drill may be guided to cut an angular hole of desired pitch. If desired a clamp 86 of U-shaped form, together with an adjustment screw 88, may be provided to hold the guide and block solidly locked against the base. At the under side of the base 70 is an angularly extending arm 90 whose degree of angularity is chosen to correspond to the pitch or angle of a mortise side desired to be formed. In operation a hole 92 is first drilled in the stone body 20 at an angle corresponding as closely as possible to the desired pitch at one side of a lewis slot. This drilling step is performed without the aid of a jig. Thereafter the arm 90 is inserted into hole 92 in the manner suggested in Figs. 8 and 9. The guide plate 74 is located in an inclined position such as that shown in Fig. 9 by inserting the block 84 between the plate 74 and the base. The thickness of the block is such as to space the plate away from the base a distance which will result in the drill held in the guide occurring at an angle of inclination corresponding to that of the hole 92. The clamp 86 is engaged to secure the block in place, and the hole is then drilled. Broaching is thereafter carried out to form a dove-tail mortise or lewis slot of the form already referred to in Fig. 13. To aid in broaching it may also be desired to form a vertical drill hole located between the two inclined holes already formed and this can readily be accomplished by locating the drill guide plate in a horizontally disposed position in contact with the base.

In Figs. 10 and 11, there has been illustrated another form of drill guide 102 mounted on a base 100 provided with an arm 106. There is first formed a slot 112 in a stone 20. The slot 112 is drilled by hand and the arm 106 then inserted. A drill sleeve 110 and a drill 108 are then passed through the guide 102 and are supported in an angular position in which there can be formed another angular hole corresponding to the first noted hole. The base is conveniently anchored to the stone surface by a pin 104, as noted. It will be noted that in this form of drill guide, provision is made for drilling only two angular holes, and it is contemplated that a central hole may be formed by hand drilling.

Having thus disclosed my invention and described in detail illustrative embodiments thereof, I claim as new and desire to secure by Letters Patent:

1. A drill jig comprising a base having a drill aperture formed therein, a frame extending above the base, bearing members located on two opposite upper sides of the frame, a drill guide mounted for rotation about a horizontal axis on the bearing members, a drill sleeve freely disposed in the drill guide, a slidable block supported in the frame in a position to engage the lower end of the drill sleeve, and a key member for straddling the block and holding it in a vertically centered position.

2. A drill jig comprising a base having a drill aperture formed therein, a frame extending above said base, bearing members located on two opposite sides of the frame, a drill guide mounted for rotation about a horizontal axis on the bearing members, a drill sleeve freely disposed in said drill guide, a slide member for engaging the lower end of the drill sleeve, and means for adjustably supporting the slide for movement between inner opposite surfaces of the said frame.

3. A structure as defined in claim 2, in which said means for adjustably supporting the slide includes studs projecting from opposite edges of the slide, and means defining a pair of guideways at either side of the frame, in which guideways the studs are pivotally and slidably received.

4. A structure as defined in claim 2, including adjustable stop means located in the path of movement of the slide at either side of the frame for limiting the travel of the slide and the arc through which the drill sleeve and drill guide may be pivoted on the said bearings.

FRANS E. ASPELIN.

References Cited in the file of this patent

UNITED STATES PATENTS

| Number | Name | Date |
|---|---|---|
| 101,466 | Hunter | Apr. 5, 1870 |
| 130,471 | Bricker | Aug. 13, 1872 |
| 201,017 | Jordan | Mar. 5, 1878 |
| 248,989 | Booth | Nov. 1, 1881 |
| 257,288 | Bush | May 2, 1882 |
| 357,729 | Murdock | Feb. 15, 1887 |
| 521,922 | Stevenson | June 26, 1894 |
| 889,273 | Thomas | June 2, 1908 |
| 1,191,595 | Hewlett | July 18, 1916 |

FOREIGN PATENTS

| Number | Country | Date |
|---|---|---|
| 102,993 | Germany | May 29, 1899 |